United States Patent
Reed et al.

(10) Patent No.: US 6,263,209 B1
(45) Date of Patent: Jul. 17, 2001

(54) METHOD AND APPARATUS IN A WIRELESS COMMUNICATION SYSTEM FOR CREATING A LEARNING FUNCTION

(75) Inventors: John Douglas Reed, Arlington; Robert Louis Breeden, Azle; Dwight Randall Smith, Grapevine; Thomas Casey Hill, Trophy Club; Slim Souissi, Fort Worth, all of TX (US); Carl Bernard Olson, San Carlos, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/362,544

(22) Filed: Jul. 28, 1999

(51) Int. Cl.[7] ....................................... H04Q 7/20
(52) U.S. Cl. ........................... 455/456; 455/404
(58) Field of Search .................... 455/456, 457, 455/38.2, 404, 567; 701/200, 204, 201, 207, 213, 300; 342/450, 357.01

(56) References Cited

U.S. PATENT DOCUMENTS 5,790,974 * 8/1998 Tognazzini ............................ 701/204
5,938,721 * 8/1999 Dussell et al. ....................... 701/211

* cited by examiner

*Primary Examiner*—Nguyen T. Vo
(74) *Attorney, Agent, or Firm*—Charles W. Bethards

(57) ABSTRACT

A wireless communication system conducts (402) communications between a fixed portion (102) of the wireless communication system and a portable subscriber unit (122) carried by a user; and records (404) a relevant aspect of the communications, thereby producing recorded information. The system determines (405) a current time of day and a current position of the user and makes (406) a comparison of the recorded information with the current time of day and the current position of the user to determine whether an alert is necessary, and generates (412) the alert when the comparison determines the alert is necessary.

14 Claims, 5 Drawing Sheets

METHOD AND APPARATUS IN A WIRELESS COMMUNICATION SYSTEM FOR CREATING A LEARNING FUNCTION

FIELD OF THE INVENTION

This invention relates in general to wireless communication systems, and more specifically to a method and apparatus in a wireless communication system for creating a learning function.

BACKGROUND OF THE INVENTION

Personal Digital Assistants (PDAs) are well known. One function that PDAs usually have supported is a scheduler or calendar for allowing a user to record appointments, meetings, and other predefined events. The scheduler typically can be programmed with a reminder which will be generated at a user-selected time prior to each event. Some PDAs have been integrated with a communication device such as a pager or a cell phone, as well.

Many events beyond the control of the user can make it difficult or impossible for the user to stay on schedule. For example, traffic congestion, road construction, or an accident along the user's route can delay the user. An extended prior appointment could overlap with a next appointment. Prior-art PDAs have not been able to deal automatically with situations such as these examples and inform the user about the need to leave earlier, or inform other users about the lapse in schedule adherence. Prior-art PDAs have required users to place a voice phone call or manually send a page to report a lapse in schedule adherence.

Thus, what is needed is a method and apparatus in a wireless communication system for creating a learning function and generating an alert in response to information learned. Preferably, the method and apparatus will act automatically to alert the user when unforeseen circumstances make it desirable for the user to leave sooner for a next scheduled event, and will further act to notify other users when the user is going to be late for an event.

SUMMARY OF THE INVENTION

An aspect of the present invention is a method in a wireless communication system for creating a learning function and generating an alert in response to information learned. The method comprises the steps of conducting communications between a fixed portion of the wireless communication system and a portable subscriber unit carried by a user; and recording a relevant aspect of the communications, thereby producing recorded information. The method further comprises the steps of determining a current time of day and a current position of the user, and making a comparison of the recorded information with the current time of day and the current position of the user to determine whether the alert is necessary. The method also includes the step of generating the alert when the comparison determines the alert is necessary.

Another aspect of the present invention is a portable subscriber unit carried by a user in a wireless communication system for creating a learning function and generating an alert in response to information learned. The portable subscriber unit comprises a receiver for receiving communications, and a processing system coupled to the receiver for processing the communications. The processing system is programmed to control the receiver to conduct the communications between a fixed portion of the wireless communication system and the portable subscriber unit, and to record a relevant aspect of the communications, thereby producing recorded information. The processing system is further programmed to determine a current time of day and a current position of the user, and to make a comparison of the recorded information with the current time of day and the current position of the user to determine whether the alert is necessary. The processing system is also programmed to generate the alert when the comparison determines the alert is necessary.

Another aspect of the present invention is a controller in a fixed portion of a wireless communication system for creating a learning function and generating an alert in response to information learned. The controller comprises a network interface for receiving communications, and a processing system coupled to the network interface for processing the communications. The controller further comprises a base station interface coupled to the processing system for controlling a base station to transmit the communications. The processing system is programmed to control the base station to conduct communications with a portable subscriber unit carried by a user, and to record a relevant aspect of the communications, thereby producing recorded information. The processing system is further programmed to determine a current time of day and a current position of the user and to make a comparison of the recorded information with the current time of day and the current position of the user to determine whether the alert is necessary. The processing system is also programmed to generate the alert when the comparison determines the alert is necessary.

DETAILED DESCRIPTION OF THE DRAWINGS

Figure 1:
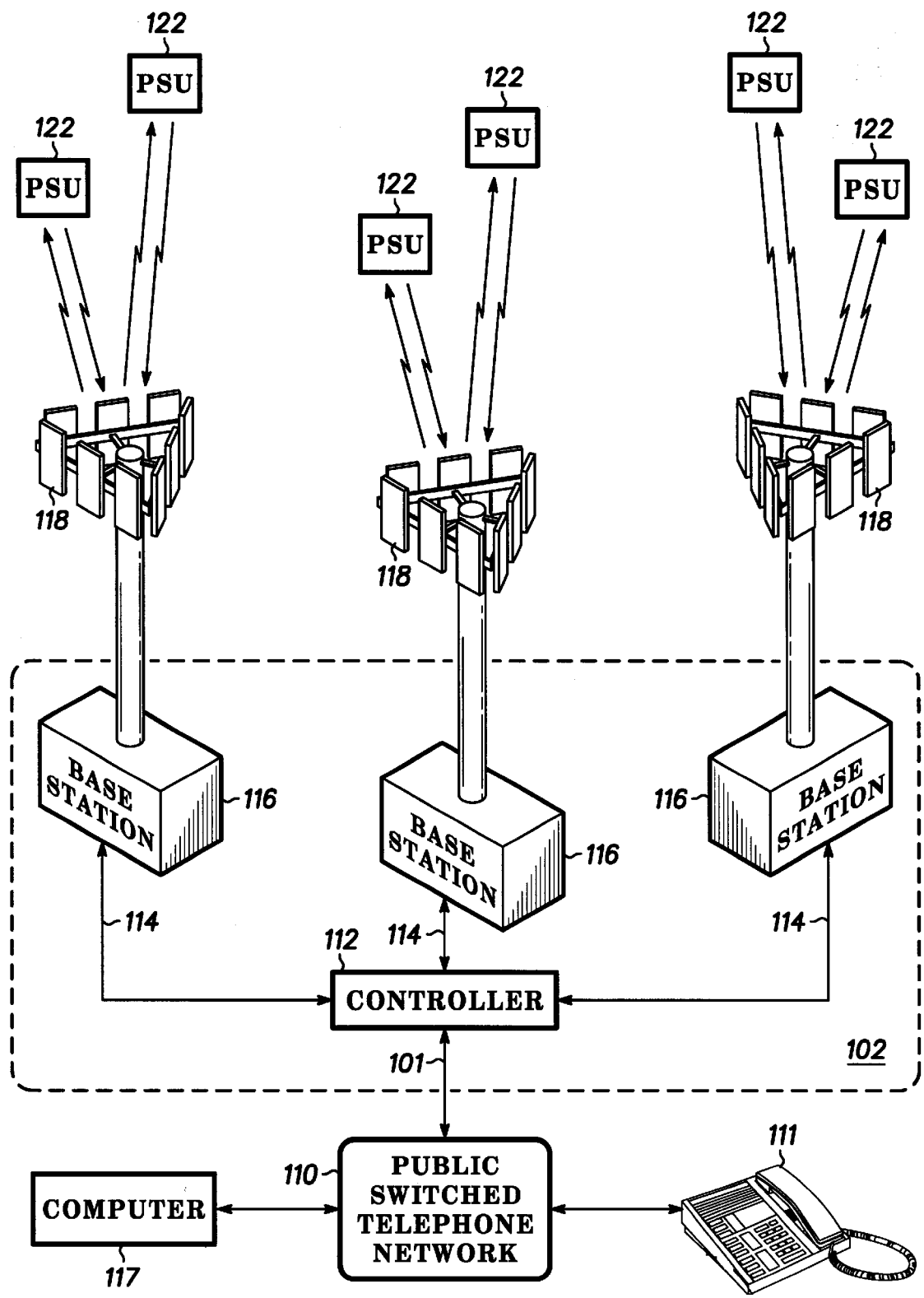
FIG. 1 is an electrical block diagram of an exemplary wireless communication system in accordance with the present invention.

Referring to FIG. 1 an electrical block diagram depicts an exemplary wireless communication system in accordance with the present invention, comprising a fixed portion 102 including a controller 112 and a plurality of conventional base stations 116, the communication system also including a plurality of portable subscriber units 122. The base stations 116 preferably communicate with the portable subscriber units 122 utilizing conventional radio frequency (RF) techniques, and are coupled by conventional communication links 114 to the controller 112, which controls the base stations 116.

The hardware of the controller 112 is preferably a combination of a Choreographer!™ network management device, a Wireless Messaging Gateway (WMG™) Administrator!™ terminal, an RF-Usher!™ multiplexer, and an RF-Conductor!™ message distributor manufactured by Motorola, Inc., and utilizes software modified in accordance with the present invention. The hardware of the base stations 116 is preferably a combination of the RF-Orchestra!™ transmitter and the RF-Audience!™ receiver manufactured by Motorola, Inc. The portable subscriber units 122 are preferably similar to PageWriter™ 2000 data portable subscriber units, also manufactured by Motorola, Inc., and also utilize software modified in accordance with the present invention. It will be appreciated that other similar hardware can be used as well for the controller 112, the base stations 116, and the portable subscriber units 122.

Each of the base stations 116 transmits RF signals to the portable subscriber units 122 via an antenna 118. The base stations 116 preferably each receive RF signals from the plurality of portable subscriber units 122 via the antenna 118. The RF signals transmitted by the base stations 116 to the portable subscriber units 122 (outbound messages) comprise selective call addresses identifying the portable subscriber units 122, and data messages originated by a message originator, as well as commands originated by the controller 112 for adjusting operating parameters of the radio communication system. The RF signals preferably transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests and requests for items of information. It will be appreciated that, alternatively, another wireless communication technology, e.g., infrared technology, can be used to communicate between the base stations 116 and the portable subscriber units 122.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations. It will be further appreciated that the computer 117 can also function as a server for providing various applications and information utilized by the wireless communication system. In that mode, the computer 117 preferably is coupled directly to the controller 112 without going through the PSTN.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. While the preferred embodiment is a two-way wireless communication system, as depicted in FIG. 1, aspects of the present invention also are applicable to a one-way wireless communication system, as well. It will be further appreciated that the present invention is applicable to many different types of wireless communication systems, including cellular telephone systems, trunked dispatch systems, and voice and data messaging systems, to name a few.

Figure 2:
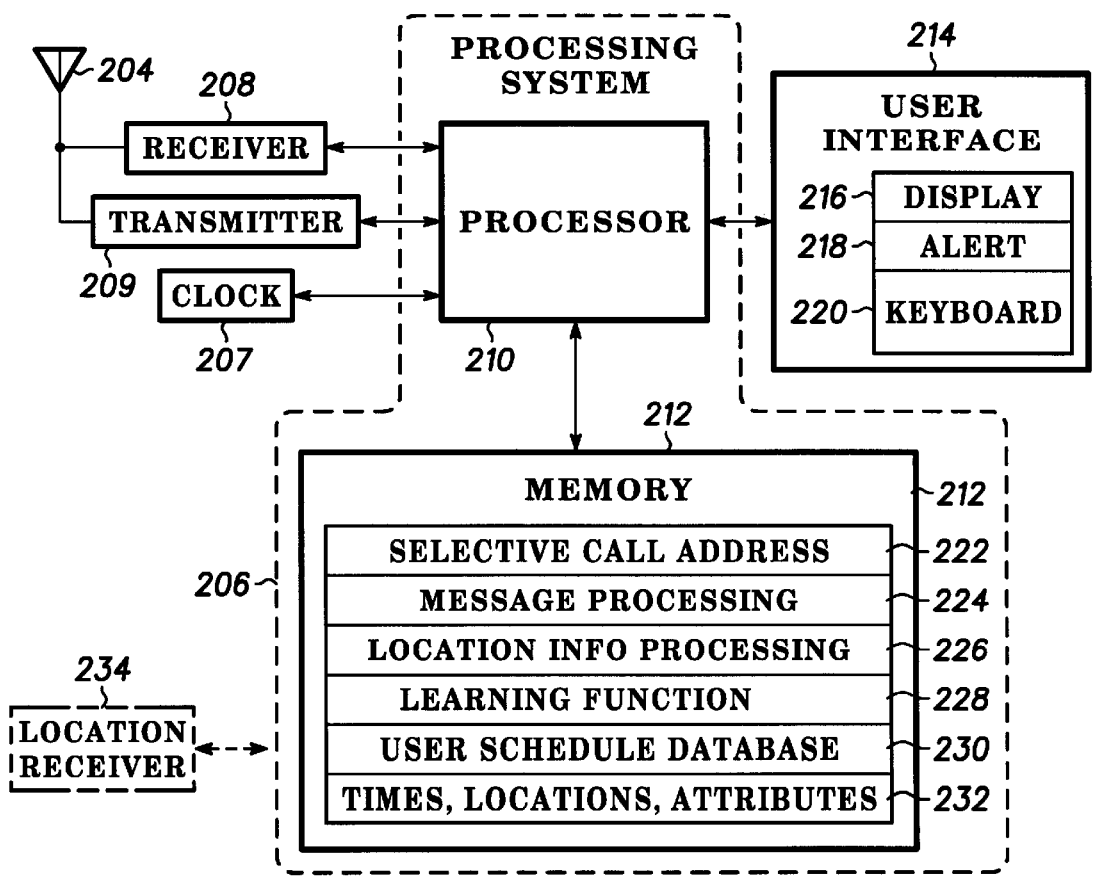
FIG. 2 is an electrical block diagram of an exemplary portable subscriber unit in accordance with the present invention.

FIG. 2 is an electrical block diagram of an exemplary portable subscriber unit 122 in accordance with the present invention. The portable subscriber unit 122 comprises an antenna 204 for intercepting an outbound message and for transmitting an inbound message. The antenna 204 is preferably coupled to a conventional receiver 208 for receiving the outbound message and is coupled to a conventional transmitter 209 for transmitting the inbound message. The receiver 208 and transmitter 209 are coupled to a processing system 206 for processing the outbound and inbound messages and for controlling the portable subscriber unit 122 in accordance with the present invention. A user interface 214 preferably is also coupled to the processing system 206 for interfacing with a user. The user interface 214 comprises a conventional keyboard 220 for requesting that an operation be performed and for controlling the portable subscriber unit 122, a conventional display 216 for reporting location information associated with the operation, and a conventional alert element 218 for alerting the user when an outbound message arrives. A conventional clock 207 is also coupled to the processing system 206 for supporting time keeping requirements of the portable subscriber unit 122.

The processing system 206 comprises a conventional processor 210 and a conventional memory 212. The memory 212 comprises software elements and data for programming the processing system 206 in accordance with the present invention. The memory 212 preferably includes a selective call address 222 to which the portable subscriber unit 122 is responsive. In addition, the memory 212 includes a message processing element 224 for programming the processing system 206 to process messages through well-known techniques. The memory 212 further comprises a location information processing program 226 for programming the processing system 206 to cooperate with the controller 112 to process location information through well-known techniques. The memory 212 also includes a learning function program 228 for programming the processing system to perform the learning function processing in accordance with the present invention. The memory 212 also includes space for storing a user schedule database 230 (a private database of the user's planned activities) created through well-known techniques. The memory 212 further comprises a space 232 for recording times, locations, and attributes corresponding to communications between the portable subscriber unit 122 and the fixed portion 102. It will be appreciated that in an alternative embodiment, some or all of the functionality provided by the learning function program 228, the user schedule database 230, and the space 232 can reside in the controller 112, instead. In one embodiment, the portable subscriber unit 122 also includes a location receiver 234, such as a Global Positioning System (GPS) receiver, coupled to the processing system 206 for helping determine the location information through well-known techniques. Operation of the portable subscriber unit 122 in accordance with the present invention will be described in detail further below.

Figure 3:
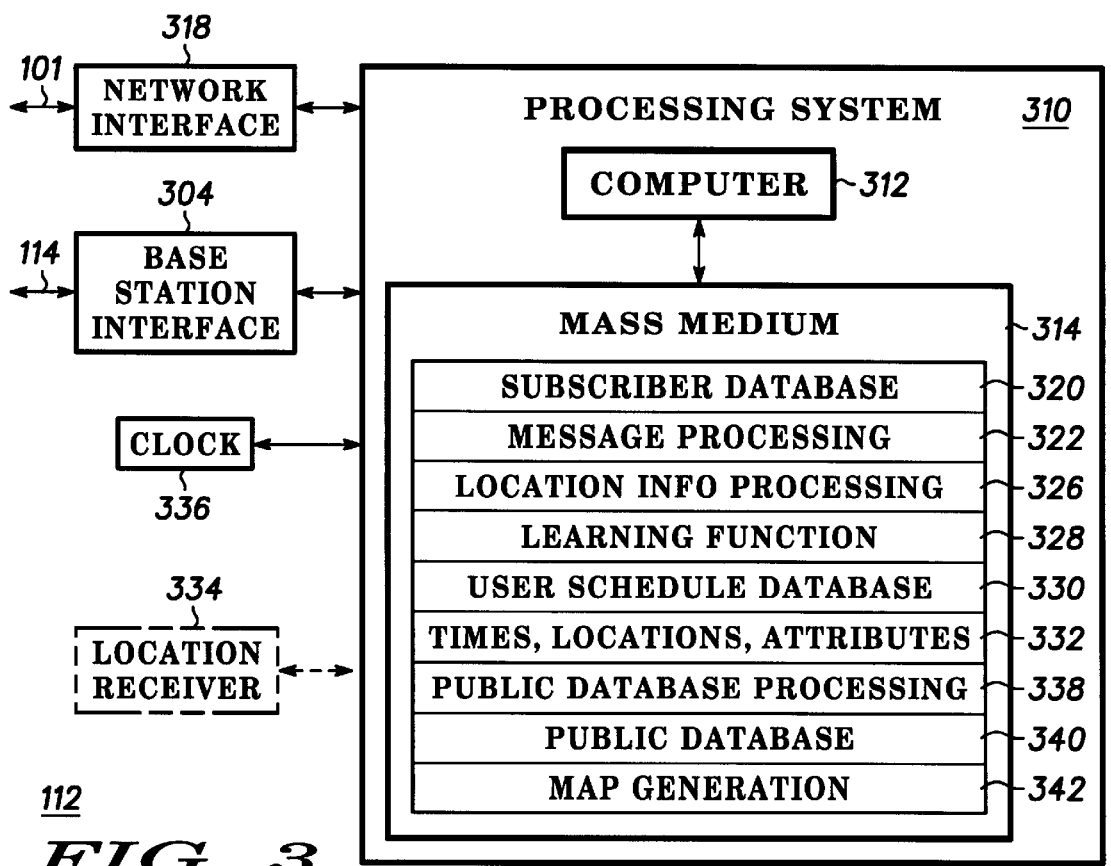
FIG. 3 is an electrical block diagram of an exemplary controller in accordance with the present invention.

FIG. 3 is an electrical block diagram depicting an exemplary controller 112 in accordance with the present invention. The controller 112 comprises a network interface 318 for receiving a message from a message originator via the telephone links 101. The network interface 318 is coupled to a processing system 310 for controlling and communicating with the network interface 318. The processing system is coupled to Cl base station interface 304 for controlling and communicating with the base stations 116 via the communication links 114. The processing system 310 is also coupled to a conventional clock 336 for providing a timing signal to the processing system 310. The processing system 310 comprises a conventional computer 312 and a conventional mass medium 314, e.g., a magnetic disk drive, programmed with information and operating software in accordance with the present invention. The mass medium 314 comprises a conventional subscriber database 320 for storing profiles defining service for subscribers using the system. The mass medium 314 further comprises a message processing element 322 for processing messages through well-known techniques.

The mass medium 314 also includes a location information processing program 326 for programming the processing system 310 to cooperate with the portable subscriber unit 122 to process location information through well-known techniques. The mass medium 314 also includes a learning function program 328 for programming the processing system 310 to process the learning function in accordance with the present invention. The mass medium 314 further comprises a user schedule database 330 for storing a plurality of schedules corresponding to a plurality of users. In addition, the mass medium 314 includes a space 332 for recording times, locations, and attributes corresponding to communications between a plurality of portable subscriber units 122 and the fixed portion 102. It will be appreciated that in an alternative embodiment, some or all of the functionality provided by the learning function program 328, the user schedule database 330, and the space 332 can reside in the portable subscriber unit 122.

The mass medium 314 further comprises a public database processing program 338 for programming the processing system 310 to maintain and utilize a public database 340 containing public information based upon the recorded information from the communications of a plurality of portable subscriber units 122 operating in the wireless communication system, in accordance with the present invention. In addition, the mass medium 314 comprises a map generation program 342 for programming the processing system to send to the portable subscriber unit 122 a map between two points requested by the user, the map comprising segments, a transit time being given for each of the segments, in response to a request from the user. It will be appreciated that, alternatively, some of the elements described above as being included in the mass medium can instead be located on a server coupled to the wireless communication system via a network, such as the Internet. In one embodiment, the controller 112 also includes a location receiver 334, such as a GPS receiver, for helping determine the location information through well-known techniques. Operation of the controller 112 in accordance with the present invention will be described further below.

Figure 4:
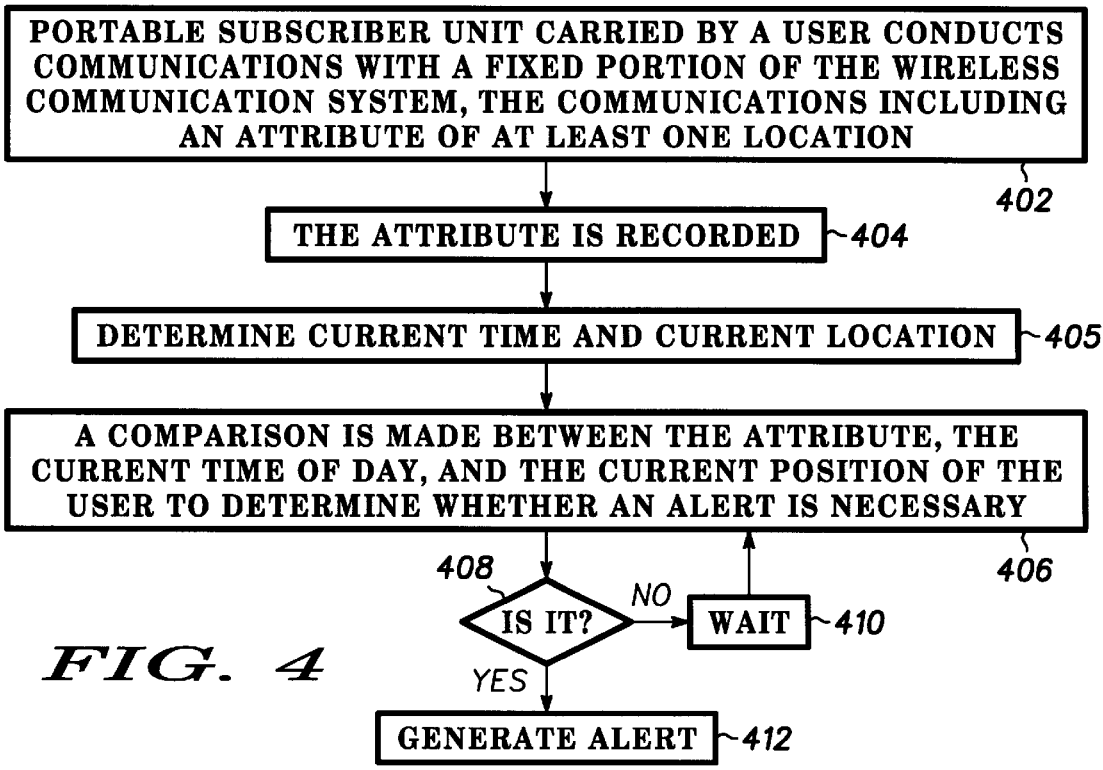
FIG. 4 is a flow diagram depicting operation of the exemplary wireless communication system in accordance with a first aspect of the present invention.

FIG. 4 is a flow diagram depicting operation of the exemplary wireless communication system in accordance with a first aspect of the present invention. The flow begins when the portable subscriber unit 122 carried by a user conducts 402 communications with the fixed portion 102 of the wireless communication system, the communications including an attribute of at least one location. The attribute is recorded 404, preferably by the portable subscriber unit 122 in the space 232. A determination is made 405, preferably by the portable subscriber unit 122 in cooperation with the fixed portion 102, of the current time of day and the current location of the user, through well known techniques, such as GPS techniques or transmitter identification codes. Then a comparison is made 406 by the portable subscriber unit 122 between the attribute, the current time of day, and the current position of the user to determine whether an alert is necessary. If, at step 408, the alert is found to be necessary, the portable subscriber unit 122 then generates 412 the alert. If not, the portable subscriber unit 122 waits 410 for a predetermined time, and then returns to step 406 to make another comparison.

A practical example of how the preceding operation can be employed is the following. A user carries the portable subscriber unit 122 into the lobby of a building. In the lobby is one of the base stations 116, configured for short range (local) coverage. The base station is broadcasting an attribute of the location-namely that the lobby entrance closes at 4:30 PM. The portable subscriber unit 122 then periodically, e.g., once per minute, compares the current time of day with the 4:30 closing time. When the portable subscriber unit 122 determines that the current time is within a predetermined time, e.g., 10 minutes, of the closing time, the portable subscriber unit 122 then further checks whether the location of the portable subscriber unit 122 indicates that the user is still in the building. If so, the portable subscriber unit 122 then sends an alert to the user, preferably an audible or vibratory alert accompanied by a message that the lobby entrance will be closing in ten minutes.

Figure 5:
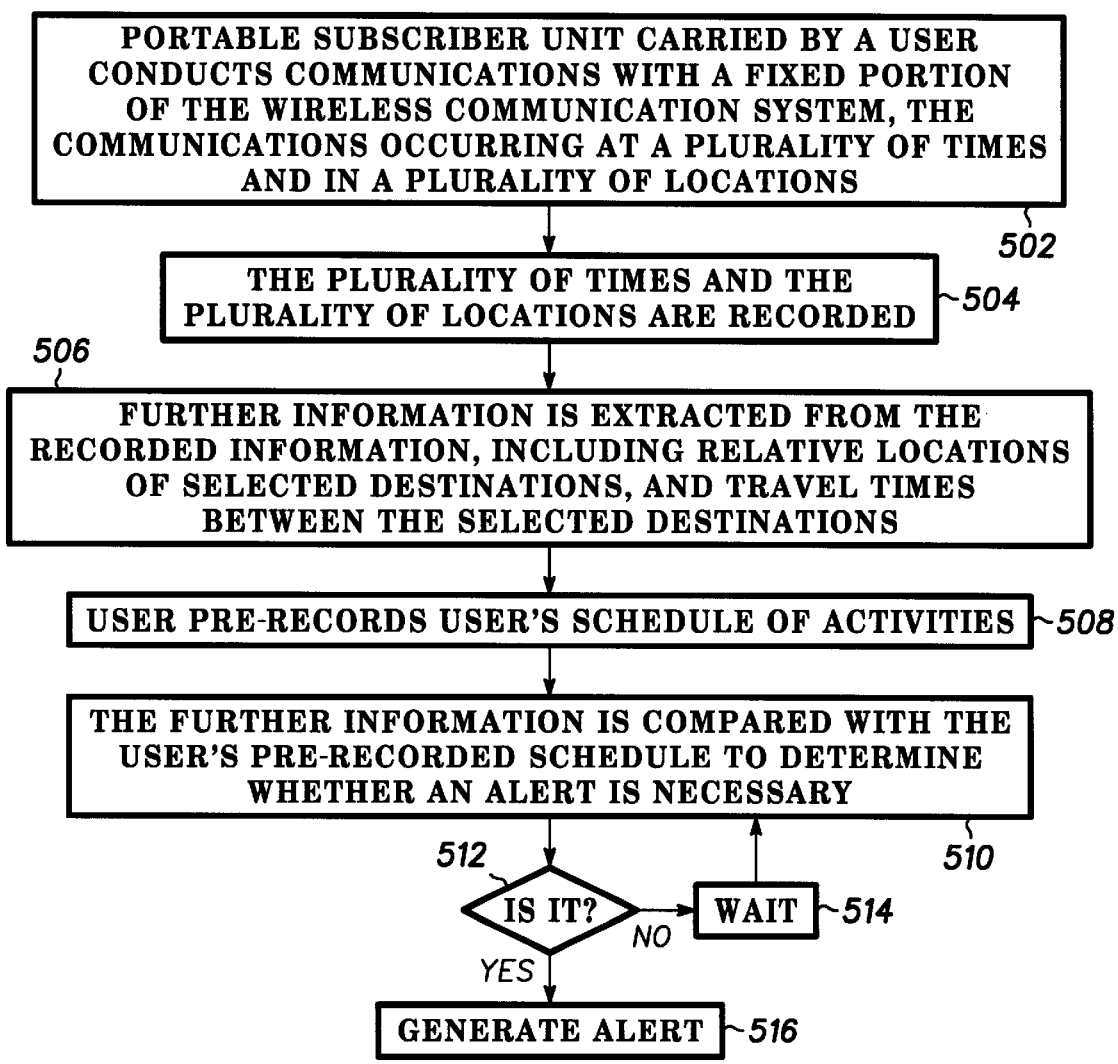
FIG. 5 is a flow diagram depicting operation of the exemplary wireless communication system in accordance with a second aspect of the present invention.

FIG. 5 is a flow diagram depicting operation of the exemplary wireless communication system in accordance with a second aspect of the present invention. Flow begins when the portable subscriber unit 122 carried by a user conducts 502 communications with the fixed portion 102 of the wireless communication system, the communications occurring at a plurality of times and in a plurality of locations. The portable subscriber unit 122 preferably records 504 the plurality of times and the plurality of locations in the space 232. When sufficient data has been recorded, the portable subscriber unit 122 then extracts 506 further information from the recorded information, including relative locations of selected destinations, and travel times between the selected destinations. Travel times preferably are determined from actual travel times experienced between the selected destinations in the past. Where actual travel times are unknown, they can be estimated from the relative locations and the likely means of getting there, e.g., same building or campus=walking; not same building or campus=driving. Alternatively, the travel times can be estimated based on velocity and direction measurements made through location technologies such as GPS.

The user also pre-records 508 the user's schedule of planned activities, preferably in the user schedule database 230, through well-known PDA techniques. The further information, e.g., a travel time for a destination scheduled to be visited today in the user schedule database 230, is compared 510 with the user's pre-recorded schedule to determine whether an alert is necessary. If, at step 512, an alert is necessary, then the alert is generated 516. If not, the portable subscriber unit 122 waits 514 a predetermined time and then returns to step 510 to make another comparison.

A practical example of how the preceding operation can be employed is the following. The user schedule database 230 indicates the user has a meeting scheduled for 10 AM in conference room "A". The user is currently located in the user's office. Based on previous communications, e.g. registrations and deregistrations, when the user has traveled between the user's office and conference room "A", the average travel time has been six minutes. Thus, at 10:54 AM, if the location information of the portable subscriber unit 122 indicates that the user has not begun to move towards conference room "A", the portable subscriber unit 122 generates an alert and message reminding the user about the scheduled meeting.

Figure 6:
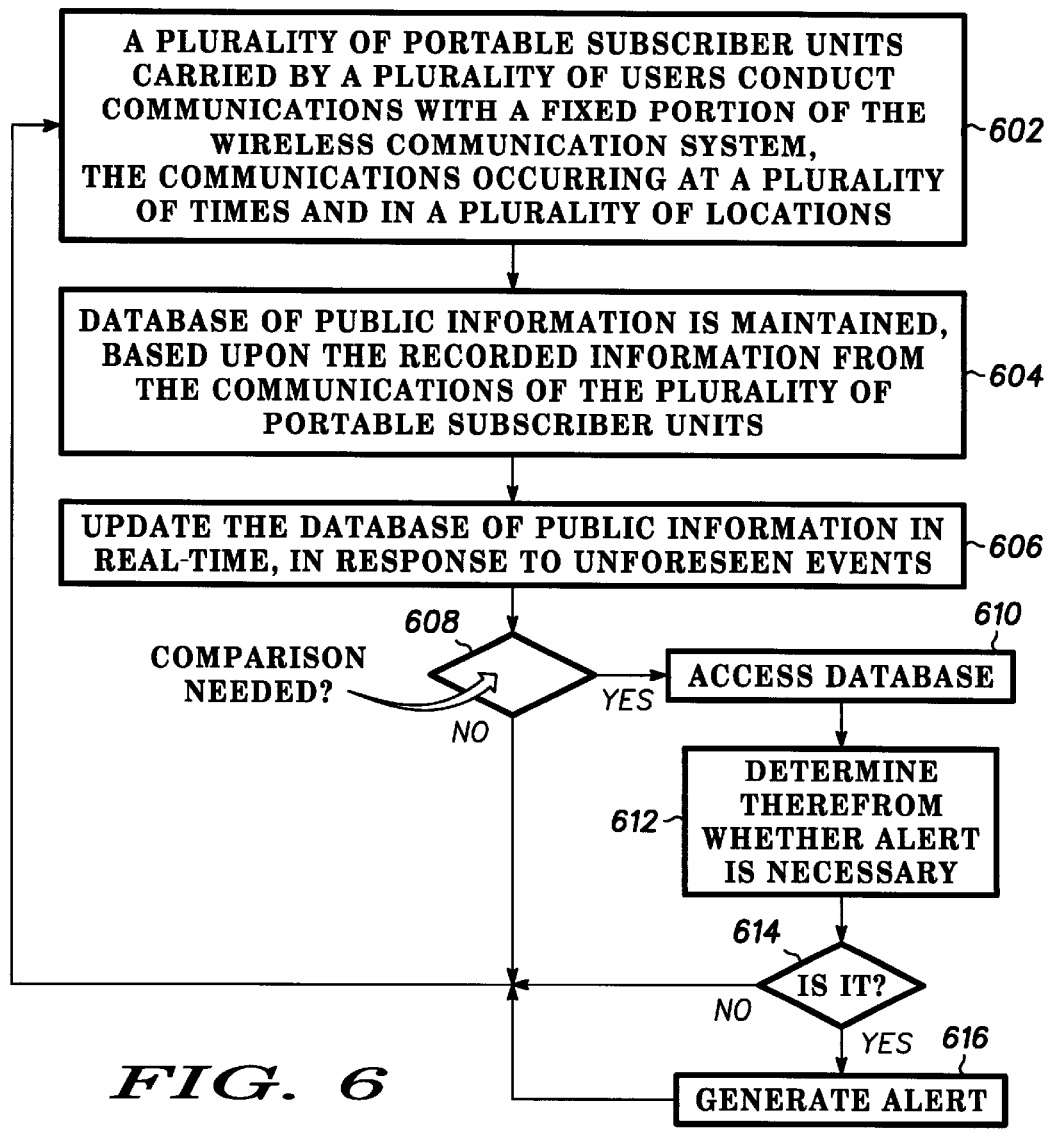
FIG. 6 is a flow diagram depicting operation of the exemplary wireless communication system in accordance with a third aspect of the present invention.

FIG. 6 is a flow diagram depicting operation of the exemplary wireless communication system in accordance with a third aspect of the present invention. Flow begins with a plurality of portable subscriber units 122 carried by a plurality of users conducting 602 communications with the fixed portion 102, the communications occurring at a plurality of times and in a plurality of locations. From the communications, a database of public information is maintained 604 by the processing system 310 and stored as the public database 340. The information in the (database of public information relates primarily to travel times experienced by users moving about on the public streets and highways, and is preferably sorted by time of day and day of week. The information preferably is also updated 606 in real-time in response to unforeseen events, e.g., an accident or construction on a particular route. The real-time update preferably is accomplished initially by a manual data entry. Alternatively, the real-time update can be accomplished automatically when velocity and direction of the plurality of portable subscriber units 122 along the route can be determined.

When, at step 608 a portable subscriber unit 122 needs to make a comparison of the user's schedule with the database of public information, the portable subscriber unit 122 communicates with the controller 112 to access 610 the public database 340 and to determine 612 therefrom whether an alert is necessary. If at step 614 the alert is necessary, the controller 112 sends 616 an alert message to the portable subscriber unit 122, and the flow returns to step 602. Otherwise, the flow returns directly to step 602. Also, when at step 608 no comparison is needed, the flow returns immediately to step 602.

A practical example of how the preceding operation can be employed is the following. The user schedule database 230 indicates that the user, whose office is downtown, has a trip planned for today, and wants to arrive at the airport by 4 PM. The portable subscriber unit 122 communicates with the controller 112 to request a departure time for mid-afternoon today from the user's location to the airport. The controller 112 responds by accessing the travel time in the public database and determining that the estimated mid-afternoon travel time today from downtown to the airport is 1 hour 10 minutes. The controller 112 then updates the user schedule database 230 of the requesting portable subscriber unit 122 with a reminder to leave for the airport at 2:50 PM. Preferably, the controller 112 also records a description of the transaction sufficient to enable the controller 112 to provide an additional update to the portable subscriber unit 122 should an unforeseen event significantly change the estimated travel time along the user's route.

On some occasions it may be helpful to update the user schedule database 230 of more than one user of the wireless communication system. For example, a sales person's user schedule database 230 indicates that the salesperson has a first meeting with a first customer scheduled from 1 PM to 2 PM. Estimated travel time to a second customer is 30 minutes. The salesperson has scheduled a second meeting with the second customer for 2:30 PM to 3:30 PM. When the first meeting runs late by 15 minutes (as indicated by the location of the salesperson's portable subscriber unit 122), the controller 112 updates the salesperson's user schedule database 230 and that of the second customer, rescheduling the second meeting to begin at 2:45, advantageously alerting the second customer about the delay.

Figure 7:
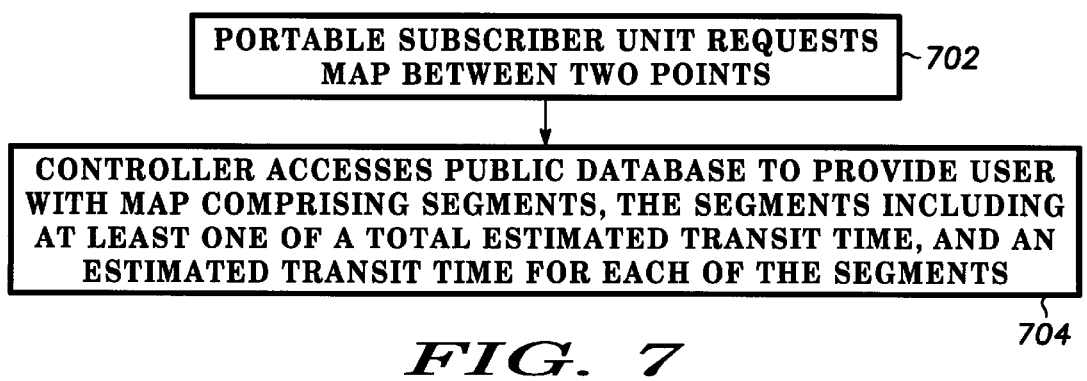
FIG. 7 is a flow diagram depicting operation of the exemplary wireless communication system in accordance with a fourth aspect of the present invention.

FIG. 7 is a flow diagram depicting operation of the exemplary wireless communication system in accordance with a fourth aspect of the present invention. The flow begins when the user of a portable subscriber unit 122 requests 702 a map between two points. For example, the user can request a map to get to the airport from the user's current location. In response, the controller 112 accesses 704 the public database 340 to provide and send to the user a map comprising segments, a transit time being given for each of the segments, as well as the total transit time, advantageously allowing the user to estimate his arrival time at the airport. It will be appreciated that, alternatively, the controller 112 can also estimate and send the user's arrival time at the airport, assuming that the user leaves immediately, Thus, it should be clear from the preceding disclosure that the present invention advantageously provides a method and apparatus in a wireless communication system for creating a learning function and generating an alert in response to information learned. Advantageously, the method and apparatus acts automatically to alert the user when unforeseen circumstances make it desirable for the user to leave sooner for a next scheduled event, and further acts to notify other users when the user is going to be late for an event.

Many modifications and variations of the present invention are possible in light of the above teachings. Thus, it is to be understood that, within the scope of the appended claims, the invention can be practiced other than as specifically described herein above.

What is claimed is:

1. A method in a portable subscriber unit for creating a learning function and generating an alert response to learned information, the method comprising the steps of:

communicating with a fixed portion of the wireless communication system a plurality of times and in a plurality of locations;

recording the plurality of times and the plurality of locations in a memory, thereby producing recorded information; and extracting further information from said recorded information, including relative locations of selected destination and travel times between the selected destination, wherein said travel times are determined from actual travel times experiences by the portable subscriber unit in the past.

2. The method of claim 1, further comprising the steps of:

pre-recording a schedule of planned activities of the user, thereby creating a pre-recorded schedule, and comparing said further information with the pre-recorded schedule to determine whether an alert is necessary.

3. The method of claim 1, wherein the fixed portion of the wireless communication system uses base stations configured for short range (local) coverage, and wherein the recording step comprises the step of determining the plurality of locations from transmitter identification codes.

4. The method of claim 1, further comprising the steps of:

cooperating with the fixed portion of the wireless communications system to maintain a database of public information based upon said recorded information from the communications of a plurality of portable subscriber units operating in the wireless communication system; and providing for a user a map between two points, in response to a request from the user, wherein the map comprises segments including at least one of a total estimated transit time between the two points, and an estimated transit time for each of the segments.

5. The method of claim 1, further comprising the steps of:

receiving information transmitted from a base station at an entrance to a predetermined area, said information describing an event which will affect said predetermined area at a specific future time;

storing said information;

periodically checking whether a current time is closer than a predetermined time to said specific future time;

determining whether the portable subscriber unit is still within said predetermined area, in response to learning that the current time is closer than said predetermined time to said specific future time; and sending the alert describing said event, in response to learning in the determining step that the portable subscriber unit is still within said predetermined area.

6. The method of claim 1, further comprising the steps of:

cooperating with the fixed portion of the wireless communication system to maintain a database of public information based upon said recorded information from the communication of a plurality of portable subscriber units operating in the wireless communication system;

accessing the database of public information; and determining whether the alert is necessary, based upon the public information.

7. The method of claim 6, wherein the cooperating step comprises the step of updating the database of public information in real-time, in response to an occurrence of an unforeseen event.

8. A portable subscriber unit carried by a user in a wireless communication system for creating a learning function and generating an alert in response to information learned, the portable subscriber unit comprising:

a receiver for receiving communications;

a user interface for interfacing with the user; and a processing system comprising a memory and coupled to the user interface and to the receiver for processing the communications, wherein the processing system is programed to:

control the receiver to communicate with a fixed portion of the wireless communication system a plurality of times and in a plurality of locations;

record the plurality of times and the plurality of locations in the memory, thereby producing recorded information; and extract further information from said recorded information, including relative locations of selected destination and travel times between the selected destinations, wherein said travel times are determined from actual travel times experienced by the portable subscriber unit in the past.

9. The portable subscriber until of claim 8, wherein the processing system is further programmed to:

pre-recorded a schedule of planned activities of the user, thereby creating a pre-recorded schedule, and compare said further information with the pre-recorded schedule to determine whether an alert is necessary.

10. The portable subscriber unit of claim 8, wherein the fixed portion of the wireless communication system uses base stations configured for short range (local) coverage, and wherein the processing system is further programmed to determine the plurality of locations from transmitter identification codes.

11. The portable subscriber unit of claim 8, wherein the processing system is further programmed to:

cooperate with the fixed portion of the wireless communication system to maintain a database of public information based upon said recorded information from the communications of a plurality of portable subscriber units operating in the wireless communication system; and provide a user a map between two points, in response to request from the user, wherein the map comprises segments including at least one of a total estimated transit time between the two points, and an estimated transit time for each of the segments.

12. The portable subscriber unit of claim 8, wherein the processing system is further programmed to:

control the receiver to receive information transmitted from a base station at an entrance to a predetermined area, said information describing an event which will affect said predetermined area at a specific future time;

store said information;

periodically check whether a current time is closer than a predetermined time to said specific future time;

determine whether the portable subscriber unit is still within said predetermined area, in response to learning that the current time is closer than said predetermined time to said specific future time; and send the alert describing said event, in response to learning in the determining step that the portable subscriber unit is still within said predetermined area.

13. The portable subscriber unit of claim 8, wherein the processing system is further programmed to:

cooperate with the fixed portion of the wireless communications system to maintain a database of public information based upon said recorded information from the communications of a plurality of portable subscriber units operating in the wireless communication system;

access the database of public information; and determine whether the alert is necessary, based upon the public information.

14. The portable subscriber unit of claim 13, wherein the processing system is further programmed to cooperate with the fixed portion of the wireless communication system to update the database of public information in real-time, in response to an occurrence of an unforeseen event.

* * * * *

UNITED STATES PATENT AND TRADEMARK OFFICE
CERTIFICATE OF CORRECTION

PATENT NO. : 6,263,209 B1  
DATED : July 17, 2001  
INVENTOR(S) : Reed et al.

Page 1 of 1

It is certified that error appears in the above-identified patent and that said Letters Patent is hereby corrected as shown below:

Claim 6,
Line 5, add -- s -- to "communication"

Claim 8,
Line 19, add -- s -- to "destination"

Claim 9,
Line 3, remove "ed" from "pre-recorded"

Signed and Sealed this

Sixteenth Day of April, 2002

Attest:

Attesting Officer

JAMES E. ROGAN
*Director of the United States Patent and Trademark Office*